(12) United States Patent
Kirton et al.

(10) Patent No.: US 8,312,454 B2
(45) Date of Patent: Nov. 13, 2012

(54) SYSTEM ADMINISTRATION METHOD AND APPARATUS

(75) Inventors: Gavin James Kirton, Erie, CO (US); Dieter Paul Schnabel, Brighton, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 1678 days.

(21) Appl. No.: 11/467,994

(22) Filed: Aug. 29, 2006

(65) Prior Publication Data

US 2008/0072229 A1 Mar. 20, 2008

(51) Int. Cl.
*G06F 9/46* (2006.01)
*G06F 15/173* (2006.01)

(52) U.S. Cl. ........ 718/100; 718/102; 718/104; 709/223; 709/224; 709/226

(58) Field of Classification Search ............... 718/100, 718/102, 104; 709/223, 224, 226
See application file for complete search history.

(56) References Cited

U.S. PATENT DOCUMENTS

| | | | |
|---|---|---|---|
| 6,198,695 B1 | 3/2001 | Kirton et al. | |
| 6,356,984 B1 | 3/2002 | Day et al. | |
| 6,904,544 B2 | 6/2005 | DeRolf et al. | |
| 7,181,743 B2* | 2/2007 | Werme et al. | 718/104 |
| 7,599,290 B2* | 10/2009 | Dos Remedios et al. | 370/230.1 |
| 7,760,643 B2* | 7/2010 | Kim et al. | 370/235 |
| 7,778,959 B2* | 8/2010 | Fries et al. | 707/609 |
| 2002/0120744 A1* | 8/2002 | Chellis et al. | 709/226 |
| 2002/0129230 A1 | 9/2002 | Albright et al. | |
| 2002/0194326 A1* | 12/2002 | Gold et al. | 709/224 |
| 2004/0078377 A1 | 4/2004 | Begg et al. | |
| 2005/0108292 A1* | 5/2005 | Burton et al. | 707/200 |
| 2005/0149940 A1* | 7/2005 | Calinescu et al. | 718/104 |
| 2005/0228796 A1 | 10/2005 | Jung | |
| 2005/0229030 A1 | 10/2005 | Nagashima et al. | |
| 2005/0235288 A1 | 10/2005 | Yamakabe et al. | |
| 2005/0246386 A1 | 11/2005 | Sullivan et al. | |
| 2005/0256735 A1 | 11/2005 | Bayne | |
| 2005/0257003 A1 | 11/2005 | Miyazaki et al. | |
| 2005/0278381 A1* | 12/2005 | Diao et al. | 707/200 |
| 2005/0289308 A1 | 12/2005 | Kano | |
| 2006/0004818 A1 | 1/2006 | Claudatos et al. | |
| 2006/0004830 A1 | 1/2006 | Lora et al. | |
| 2006/0004868 A1 | 1/2006 | Claudatos et al. | |
| 2006/0026179 A1* | 2/2006 | Brown et al. | 707/100 |
| 2006/0117221 A1* | 6/2006 | Fisher et al. | 714/21 |
| 2006/0294238 A1* | 12/2006 | Naik et al. | 709/226 |
| 2007/0083650 A1* | 4/2007 | Collomb et al. | 709/224 |
| 2007/0101000 A1* | 5/2007 | Childress et al. | 709/226 |
| 2007/0168634 A1* | 7/2007 | Morishita et al. | 711/170 |

FOREIGN PATENT DOCUMENTS

WO WO02/073398 9/2002

* cited by examiner

*Primary Examiner* — Emerson Puente
*Assistant Examiner* — Charles Swift
(74) *Attorney, Agent, or Firm* — Thomas J. Lavan; Bradley Knepper

(57) ABSTRACT

A system, device, and method are provided for managing one or more computer resource systems. More specifically, the present invention provides for the automated maintenance of a computer resource and gradual change of management policies based upon a state of the computer resource. Moreover, the present invention is capable of generating commands related to changing the configuration of the computer resource and maintaining a log of generated commands for later reference by a system administrator. Further, the present invention includes one or more human user written policies, in some computer understandable format, to manage the system and accomplish specific goals based on the system's dynamic nature or behavior.

27 Claims, 11 Drawing Sheets

SYSTEM ADMINISTRATION METHOD AND APPARATUS

FIELD

The present invention is directed to system administration. In particular, the present invention describes methods and apparatuses for automatically controlling parameters of a computer resource and updating control thresholds of the same.

BACKGROUND

The need to process and store digital files, documents, pictures, images and other data continues to increase rapidly. Accordingly, computer resources continue to be developed and refined. In connection with the electronic storage of data, various data storage systems have been devised for the rapid and secure storage of large amounts of data. Such systems may include one or a plurality of storage devices that are used in a coordinated fashion. Devices can also provide improved data access and/or storage times. Whether implemented using one or a plurality of storage devices, the storage provided by a data storage system can be treated as one or more storage volumes.

As computer resources have evolved, increasing amounts of data have been made available to system administrators. For example, data storage products and other computer resource systems have been created that provide more information in the form of performance metrics relating to system performance that are stored in a performance log. In some instances, a performance log may contain hundreds of entries for a large number of performance metrics related to the system.

The system administrator reads the performance metrics of the system and makes decisions as to how storage space, storage controllers, data channels, processors, and other storage assets should be allocated. Typically, the system administrator is expected to analyze most or all of the performance metrics provided to him/her while monitoring the system performance. Thus, as the number of performance metrics provided by a system increases, the job of the administrator increases in difficulty. Because most computer resource systems require a high level of quality control, experienced system administrators are typically hired to manage those systems. As the amount of performance data available to administrators has increased, the number of administrators required to review the data has increased. This in turn increases the cost of maintaining computer resource systems. One way to decreases costs would be to hire a less experienced person to manage the system. Unfortunately, this may lead to improper decisions and may sacrifice system performance and data. One goal of computer resource system developers is to lower costs for their products. However, if a low cost system still requires high priced personnel to manage the system, then the cost savings of the system are offset, thus decreasing the cost effectiveness of the system.

There have been some attempts to reduce the level of expertise required of the system administrator. Specifically, automated expert systems have been deployed in some data storage systems. These expert systems automatically monitor some or all of the performance metrics and compare them with predetermined metric thresholds when the performance metric is received. If the received performance metric meets or exceeds a corresponding metric threshold, then the expert system can notify the system administrator that their attention is required. Such expert systems can operate rather effectively and efficiently in a particular setting as long as the behavior of the system or system environment does not change. However, such expert systems can only be effectively used with systems in which they are an "expert". In other words, the expert system must be programmed to deal with certain situations that occur within a particular system under certain conditions. If the behavior of the system does change, then the expert system is no longer an expert. Rather, the thresholds programmed in the expert system along with other algorithms provided therein may become useless when trying to manage the system having new behaviors.

SUMMARY

The present invention is directed to solving these and other problems and disadvantages of the prior art. In accordance with embodiments of the present invention, a computer resource management system is provided. More specifically, the computer resource management system is equipped with a management application. In one embodiment, the management application comprises an inference engine that is capable of receiving various data inputs related to the operation of the computer resource. The inputs received at the management system are mapped against a set of policies that define how the computer resource is to be managed. Based on the mapping, the inference engine can then make asynchronous decisions regarding how the computer resource should be managed.

In accordance with embodiments of the present invention, a decision can be made to change the configuration of the computer resource. A configuration change order can be issued by the management system, which in turn can be executed by the computer resource and/or a system administrator. The configuration change may require the redistribution of computer resource assets within the computer resource and between other computer resources.

In accordance with further embodiments of the present invention, a decision can be made to change one or more policies in the set of policies that define how the computer resource is to be managed. A policy change can be instituted in response to a change in activity of a particular computer resource. For example, if an initial set of policies was based on a particular estimated amount of activity and the activity of the computer resource varies from the estimated activity, then one or more policies in the set of policies can be updated such that the computer resource is properly managed based on the actual level of activity and not the estimated level of activity.

In accordance with still further embodiments of the present invention, when a configuration and/or policy change is initiated, feedback may be provided to the computer resource management system. The feedback can show what type of change was made and how it affects the computer resource. The feedback also provides the computer resource management system a mechanism for staying updated on the current state of the computer resource. In one embodiment, the computer resource management system uses the feedback as input for making subsequent management decisions.

Additional features and advantages of embodiments of the present invention will become more readily apparent from the following description, particularly when taken together with the accompanying drawings.

DETAILED DESCRIPTION

Figure 1A:
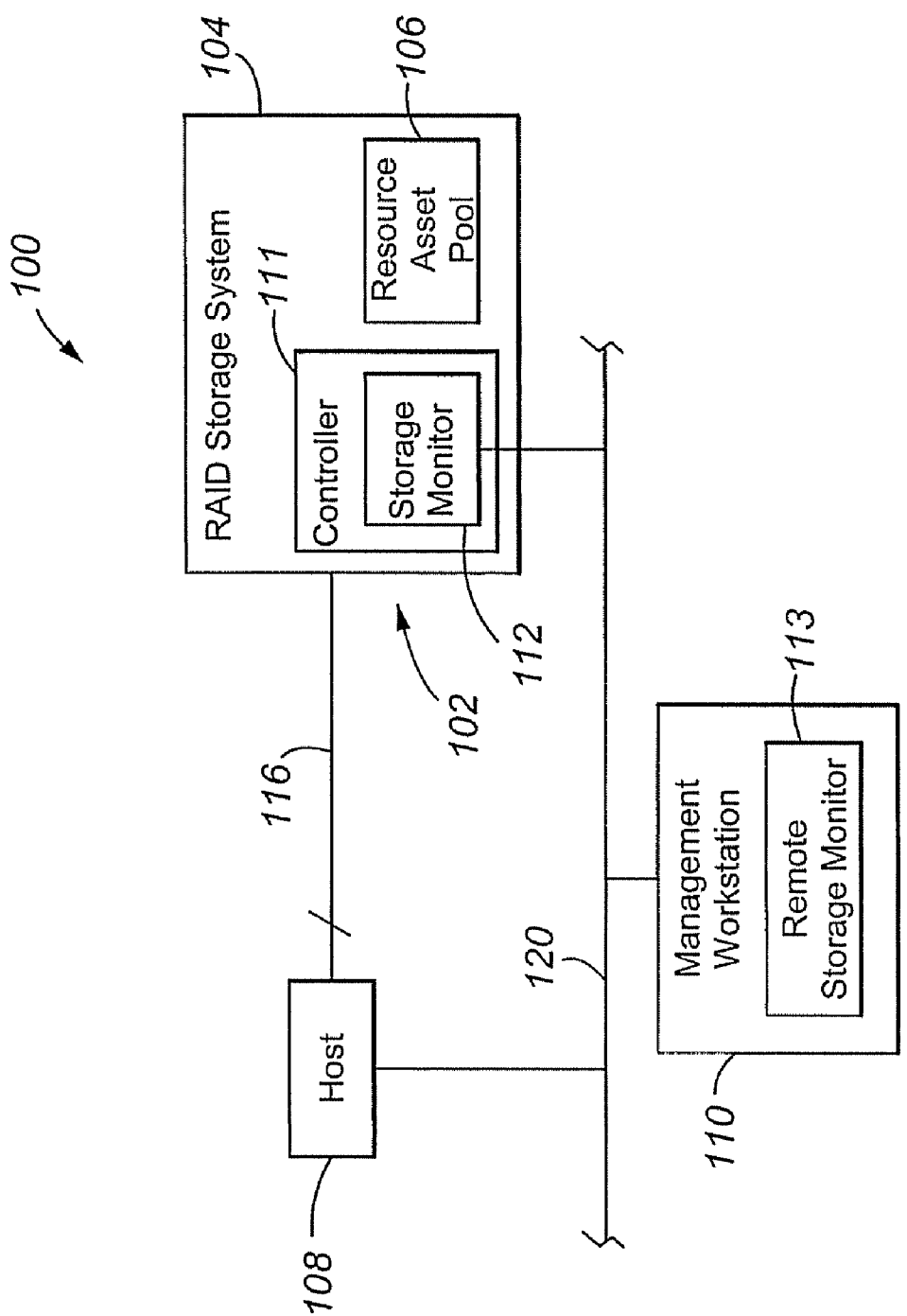
FIG. 1A is a block diagram depicting components of an electronic data system incorporating a data storage system employing a storage monitor in accordance with embodiments of the present invention.

FIG. 1A is a block diagram depicting an electronic data system 100 in accordance with embodiments of the present invention comprising a computer resource 102. The computer resource 102 generally includes intelligence or functions for managing or controlling computer resource assets within the computer resource 102. In one embodiment, the computer resource 102 may comprise a storage system 104 such as a RAID storage system or the like for storing large amounts of data.

The electronic data system 100 may also include a host processor, computer or computer system 108. Additionally, the electronic data system 100 can include an external management workstation 110 comprising a remote storage monitor 113. The host 108 can be connected to the storage system 104 through an in-band network 116 and/or an out-of-band network 120. The networks 116, 120 generally provide or support communication capabilities between the host 108, the storage system 104, and, if included, the external management workstation 110.

The in-band network 116 generally functions to transport data between the storage system 104 and host 108, and can be any data pipe capable of supporting storage system 104 data transfers. Accordingly, examples of in-band networks 116 include Fibre Channel (FC), iSCSI, parallel SCSI, Ethernet, ESCON, or FICON connections or networks, which may typically be characterized by an ability to transfer relatively large amounts of data at medium to high bandwidths.

The out-of-band network 120 generally functions to support the transfer of communications events and/or messages between the external management workstation 110, the storage system 104, and the host 108. Examples of an out-of-band communication network 120 include a local area network (LAN) or other transmission control protocol/Internet protocol (TCP/IP) network. In general, the out-of-band communication network 120 is characterized by an ability to interconnect disparate nodes or other devices through uniform user interfaces, such as a web browser without impact to the data pipe feeding system 104.

In one embodiment, the remote storage monitor 113 application or software utility residing on and executed by the external management workstation 110 receives event and other performance data from the computer resource 102 such as the storage system 104 and/or host 108. The external management workstation 110 employs the remote storage monitor 113 to analyze the event and performance data to automatically manage the operation of the computer resource 102.

In another embodiment, a storage monitor 112 comprises an application or software utility executed by a controller 111 that resides in the storage system 104 and manages the operation of the storage system 104. The storage monitor 112 can receive data or commands from the storage system 104, the host 108 and/or the external management workstation 110 notifying it of certain conditions associated with the electronic data system 100. Based on the data received, the storage monitor 112 can adjust the configuration of computer resources employed by the storage system 104 and/or policies governing the operation of the storage system 104. In accordance with still other embodiments of the present invention, functions related to automatic management of the storage system 104 may be distributed between one or more storage monitors 113 running on one or more workstations 110 and/or one or more storage monitors 112 running on one or more storage systems 104. The storage monitors 112 and/or 113 may further provide a user interface for controlling aspects of the operation of the storage system 104.

The storage monitors 112 and/or 113 are typically in communication with a resource asset pool 106, which is a logical representation of the resource assets not currently being employed by the storage system 104 but otherwise available for use by the storage system 104. Some of the computer resource assets listed in the resource asset pool 106 may be physically associated with the storage system 104 whereas other computer resource assets may be external to the storage system 104 and are associated with another computer resource 102. Computer resource assets listed in the resource asset pool 106 may include spare disk drives or other storage devices, spare controllers, spare processors, spare data channels, and the like.

Figure 1B:
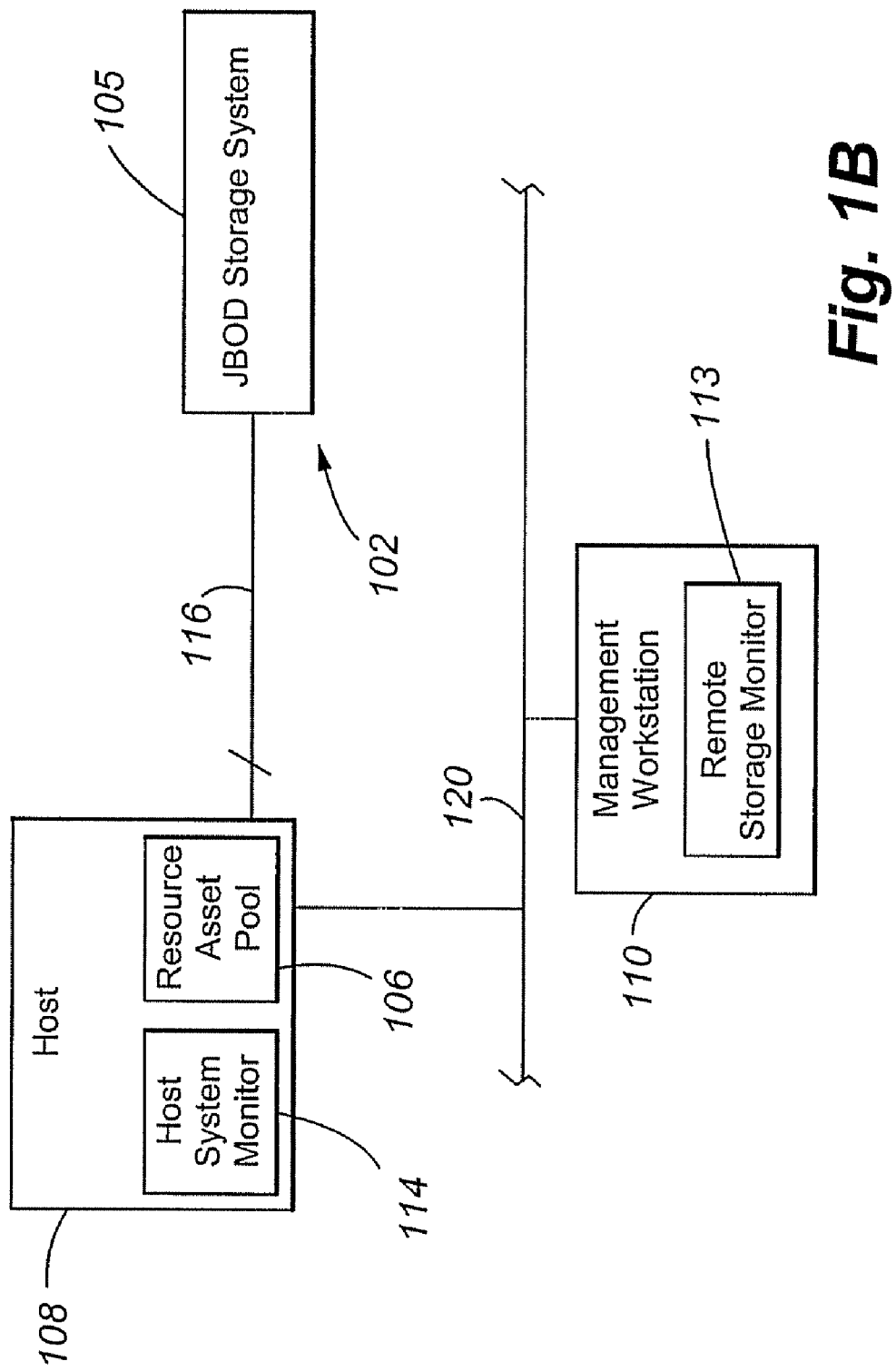
FIG. 1B is a block diagram depicting a host employing a storage monitor in accordance with embodiments of the present invention.

FIG. 1B is a block diagram depicting a data system 100 in accordance with embodiments of the present invention incorporating a computer resource 102 such as a simple storage system 105. In contrast to the storage system 104 described above in relation to FIG. 1A, the simple storage system 105 does not include a controller or intelligence for controlling computer resource assets internally. Accordingly, the configuration of computer resource assets within the simple storage system 105 is controlled and managed by the external management workstation 110 or through the host 108. Thus, the simple storage system 105 is only connected to the host 108 through the in-band network 116. The external management workstation 110 may communicate with the host 108 via the out-of-band network 120. The host 108 can then forward commands received from the management workstation 110 to the simple storage system 105 through the in-band network 116. In accordance with still other embodiments of the present invention, the functions of the host 108 and the external management workstation 110 can be performed by a single device.

The host 108 may also comprise a host system monitor 114 for controlling the operation of the simple storage system 105. Accordingly, a host 108 may also include a host system monitor 114 for controlling a storage system 104 whether the storage system includes a storage monitor 112 or not. The host system monitor 114 can be used to control the operation of the computer resource assets within the simple storage system 105. Alternatively, the host system monitor 114 may receive commands and/or other data from a remote storage monitor 113 to control the computer resource assets of the simple storage system 105.

Generally speaking, the host system monitor 114 operates in a similar fashion to the storage monitor 112 described above in that the host system monitor 114 receives performance and other data related to the simple storage system 105 and then controls the operation of the simple storage system 105 based on the received data. The data may be received from the simple storage system 105 and/or may be received through the operation of the host 108. As can be appreciated, the types of data received from the simple storage system 105 may differ from data received through the host 108.

Certain embodiments of the present invention do not employ both the host system monitor 114 and the remote storage monitor 113 to manage the simple storage system 105. For example, the host system monitor 114 may be the sole monitoring application required to manage the simple storage system 105. In such embodiments, an out-of-band network 120 may not be necessary to manage the simple storage system 105. Alternatively, the remote storage monitor 113 may be the only monitoring application that manages the simple storage system 105.

Figure 1C:
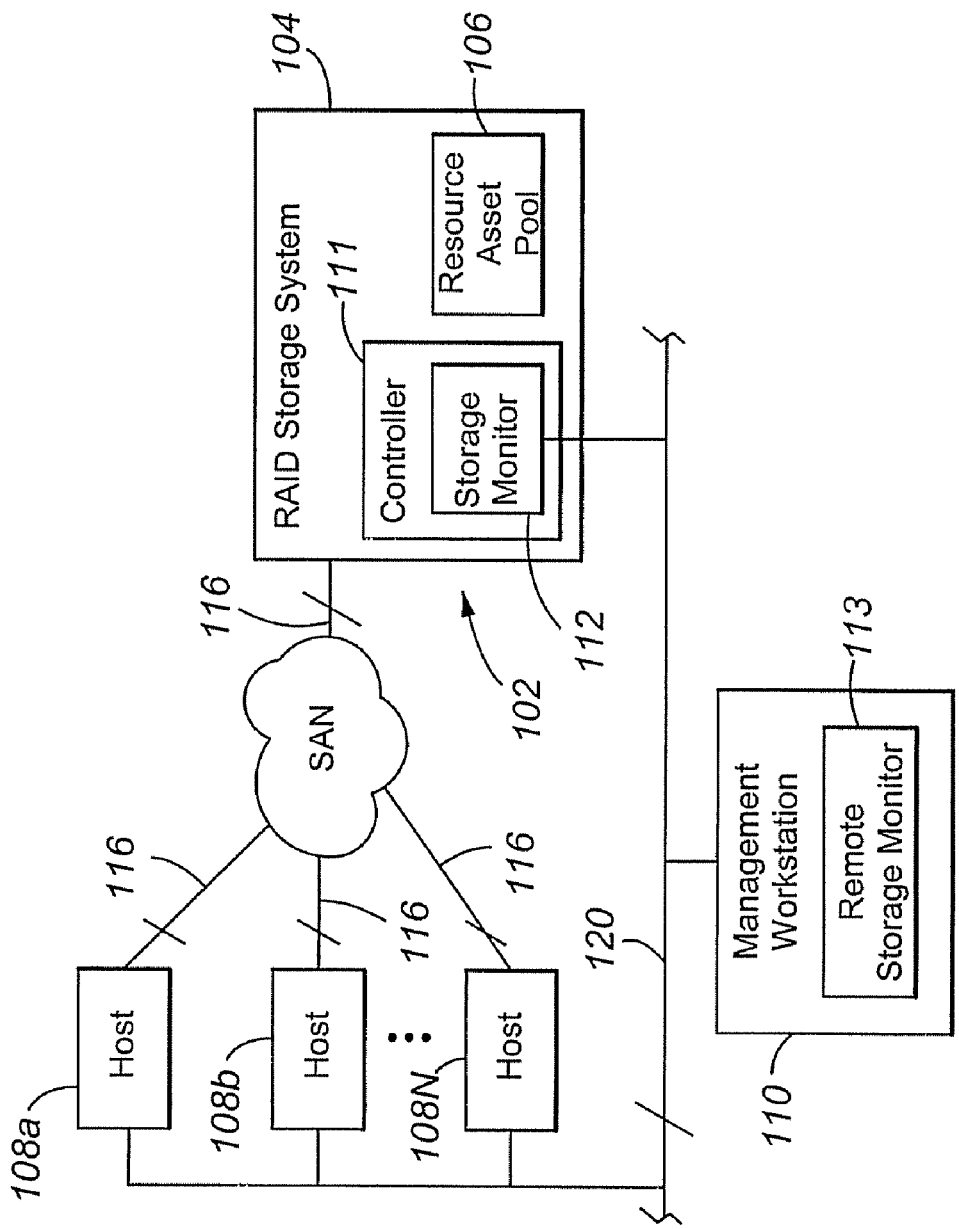
FIG. 1C is a block diagram depicting a plurality of hosts connected to a storage system employing a storage monitor through a Storage Area Network in accordance with embodiments of the present invention.

FIG. 1C is a block diagram depicting a data system 100 in accordance with embodiments of the present invention incorporating a plurality of hosts 108a-N connected to a computer resource 102, such as a storage system 104, via a Storage Area Network (SAN), where N is greater than or equal to one. The SAN represents one type of in-band network 116 that can be used to connect multiple hosts 108 to a storage system 104. Each host 108 can communicate through the in-band network 116 with the storage system 104. Additionally, the storage monitor 112 and/or the remote storage monitor 113 may be capable of communicating and of receiving performance data from the plurality of hosts 108 either through the in-band network 116 and/or the out-of-band network 120.

In accordance with embodiments of the present invention, only one storage monitor 112 or 113 is used to manage the storage system 104. For example, the storage monitor 112 running on the storage system 104 controller 111 can comprise the application managing the storage system 104. On the other hand, the remote storage monitor 113 may comprise the application monitoring and managing the storage system 104.

Figure 1D:
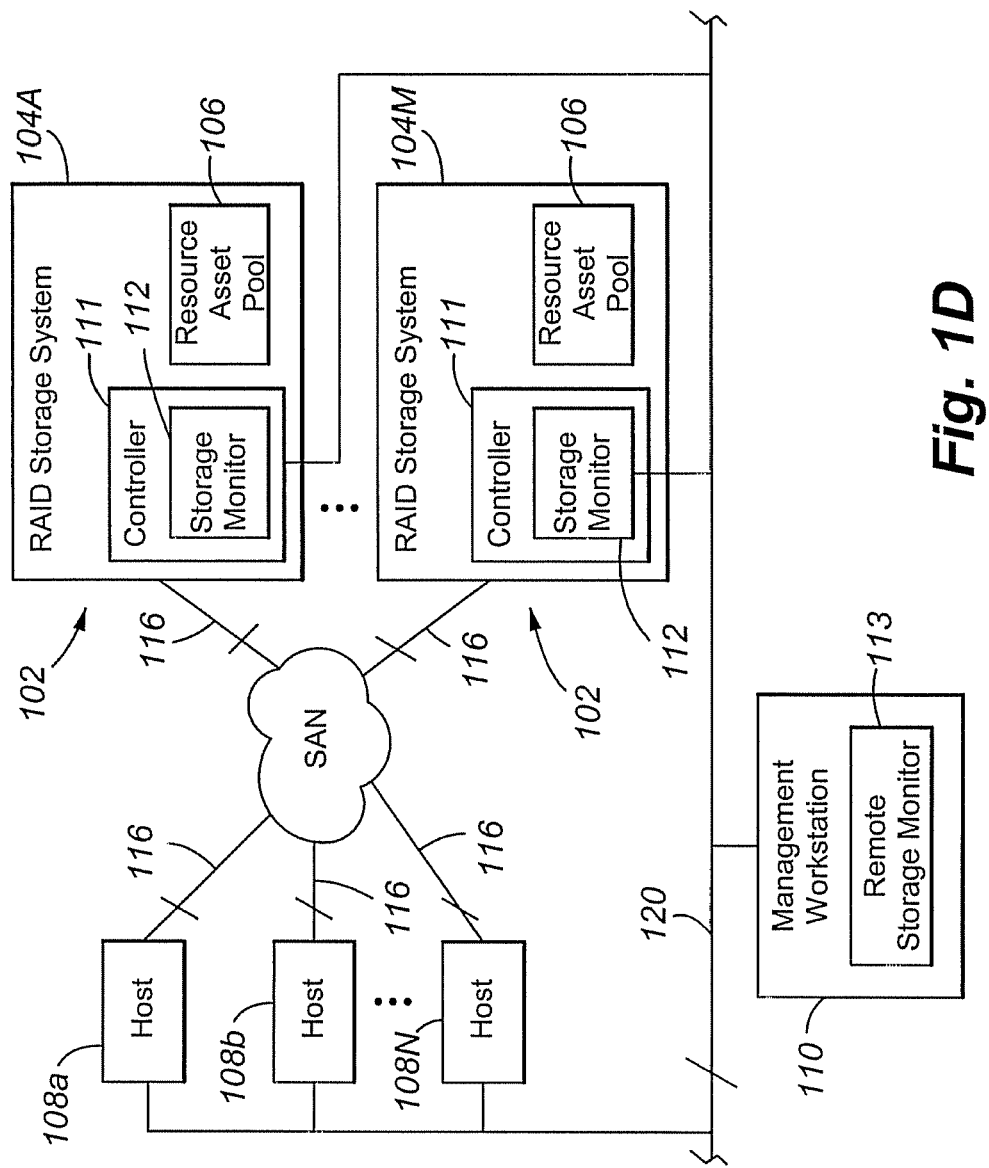
FIG. 1D is a block diagram depicting a plurality of hosts connected to a plurality of storage systems employing storage monitors through a Storage Area Network in accordance with embodiments of the present invention.

FIG. 1D is a block diagram depicting a data system 100 in accordance with embodiments of the present invention incorporating a plurality of hosts 108a-N connected to a plurality of storage systems 104a-M, where M is greater than or equal to one. The hosts 108a-N are generally connected to the storage systems 104a-M through in-band network 116. The configuration of the in-band network 116 is similar to the SAN described above in that any of the hosts 108a-N can communicate with any storage system 104a-M through the in-band network 116. Moreover, the hosts 108a-N can communicate with the storage systems 104a-M via the out-of-band network 120 if desired.

Figure 2A:
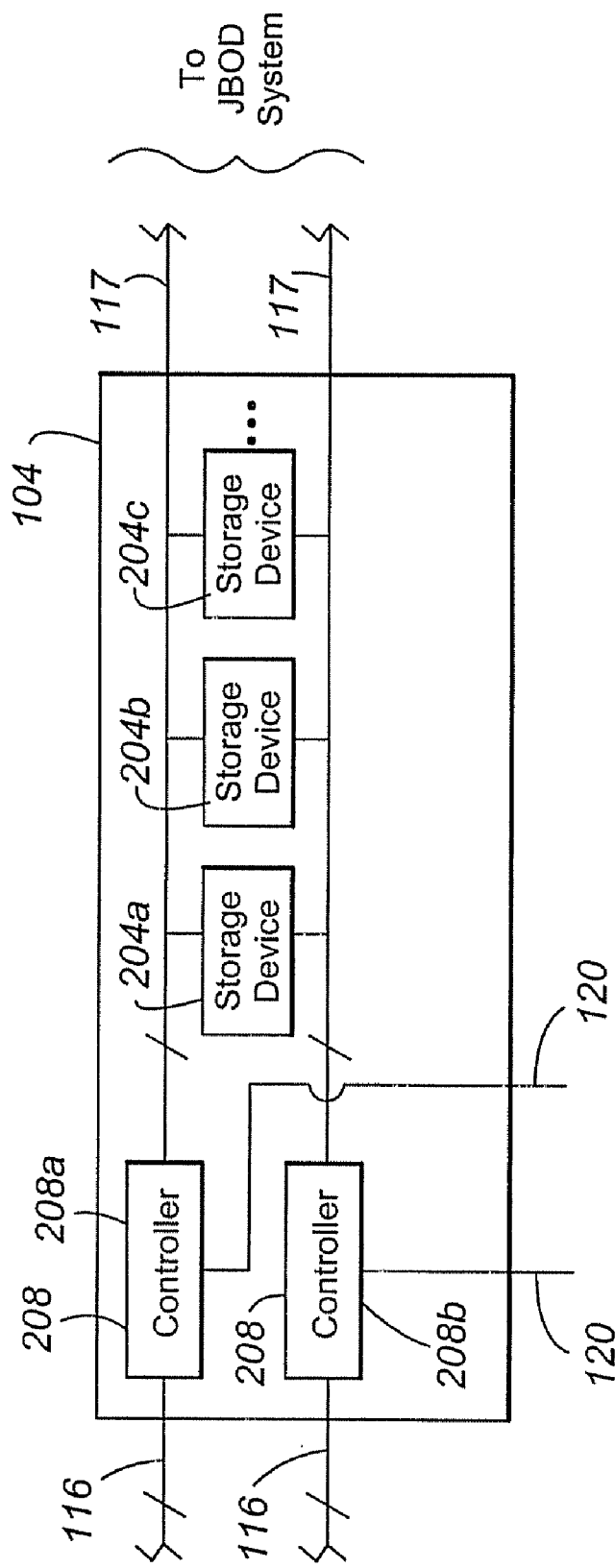
FIG. 2A is a block diagram depicting a data storage system with controllers in accordance with embodiments of the present invention.

FIG. 2A illustrates components that may be included in a storage system 104 in accordance with embodiments of the present invention. In general, the storage system 104 includes a number of storage devices 204. Examples of storage devices 204 include hard disk drives, such as serial advanced technology attachment (SATA), small computer system interface (SCSI), serial attached SCSI (SAS), Fibre Channel (FC), or parallel advanced technology attached (ATA) hard disk drives. Other examples of storage devices 204 include magnetic tape storage devices, optical storage devices or solid-state disk devices. Furthermore, although three storage devices 204a-c are illustrated, it should be appreciated that embodiments of the present invention are not limited to any particular number of storage devices, and that a lesser or greater number of storage devices 204 may be provided as part of a storage system 104.

A storage system 104 in accordance with embodiments of the present invention may be provided with a first controller 208a for controlling the flow of data to the storage devices 204. In addition, other embodiments may include one or more additional controllers, such as a second controller 208b. The storage system 104 may be operated by a single controller 208a in a non-redundant mode. As can be appreciated by one of skill in the art, the provision of two controllers 208a, 208b permits data to be mirrored between the controllers 208a, 208b, providing improved performance and data availability over a single controller embodiment.

The controllers 208 receive instructions and/or data from external devices through the in-band network 116 and/or the out-of-band network 120. The remote storage monitor 113 running on the external management workstation 110 and/or the storage monitor 112 can determine which controllers 208 should be assigned to which storage devices 204. Accordingly, one controller may be assigned to send data to a first subset of the storage devices 204 while another controller may be assigned a second subset of storage devices 204 to which it sends data. Moreover, the storage system 104 is not required to employ all of the storage devices 204 controllers 208 or other associated assets at once. Instead, some computer resource assets may remain in an idle state and thus are a part of the resource asset pool 106. Computer resource assets in the resource asset pool 106 can be made available to the storage system 104 upon request.

One or more device channels 117 are generally provided for each controller 208. The device channels 117 generally interconnect the corresponding controller 208 to the storage devices 204. Furthermore, while illustrated as a number of dedicated channels 117, it can be appreciated that a single shared bus or channel 117 can be shared between both controllers 208. The channels 117 may further provide the controllers 208 with the capability to connect to additional computer resources 102 like a simple storage system 105 or other devices.

Although some storage systems 104 are generally implemented as a complete RAID system, it should be appreciated that the storage system 104 can comprise one or more storage volumes implemented in various other ways. For example, the storage system 104 may comprise a hard disk drive or other storage device 204 connected or associated with a server or a general-purpose computer.

Figure 2B:
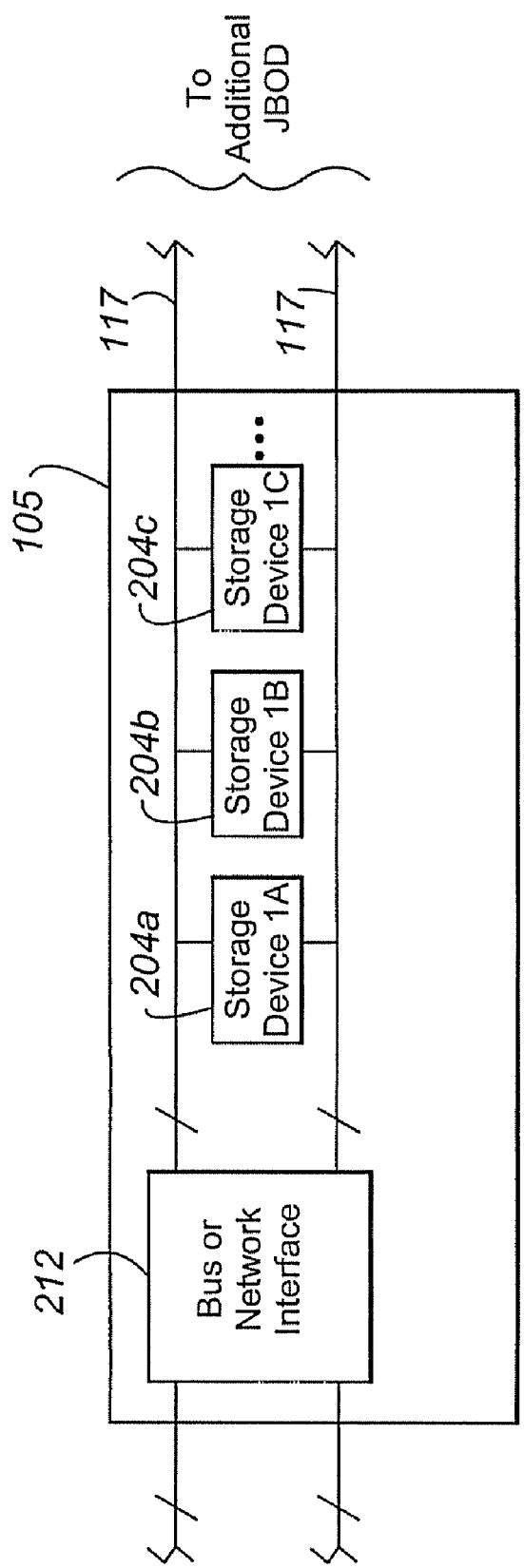
FIG. 2B is a block diagram depicting a simple data storage system in accordance with embodiments of the present invention.

Referring to FIG. 2B, a simple storage system 105 will be described in accordance with embodiments of the present invention. The simple storage system 105 may comprise a Just a Bunch of Disks (JBOD) system or a Switched Bunch of Disks (SBOD) system. The simple storage system 105 may further comprise a bus or network interface 212 for connecting to either the in-band network 116 or a storage system 104. The simple storage system 105 does not generally comprise a controller or the like. Rather, data is sent to the simple storage system 105 with a destination address associated therewith. The data is already directed toward a predetermined storage device 204. Thus, no controller is necessary to route the data to any location. As can be seen, additional computer resources 102 including storage systems 104, 105 may be linked together in known configurations such that a storage system 104 has more computer resource assets available if they become needed.

Figure 3:
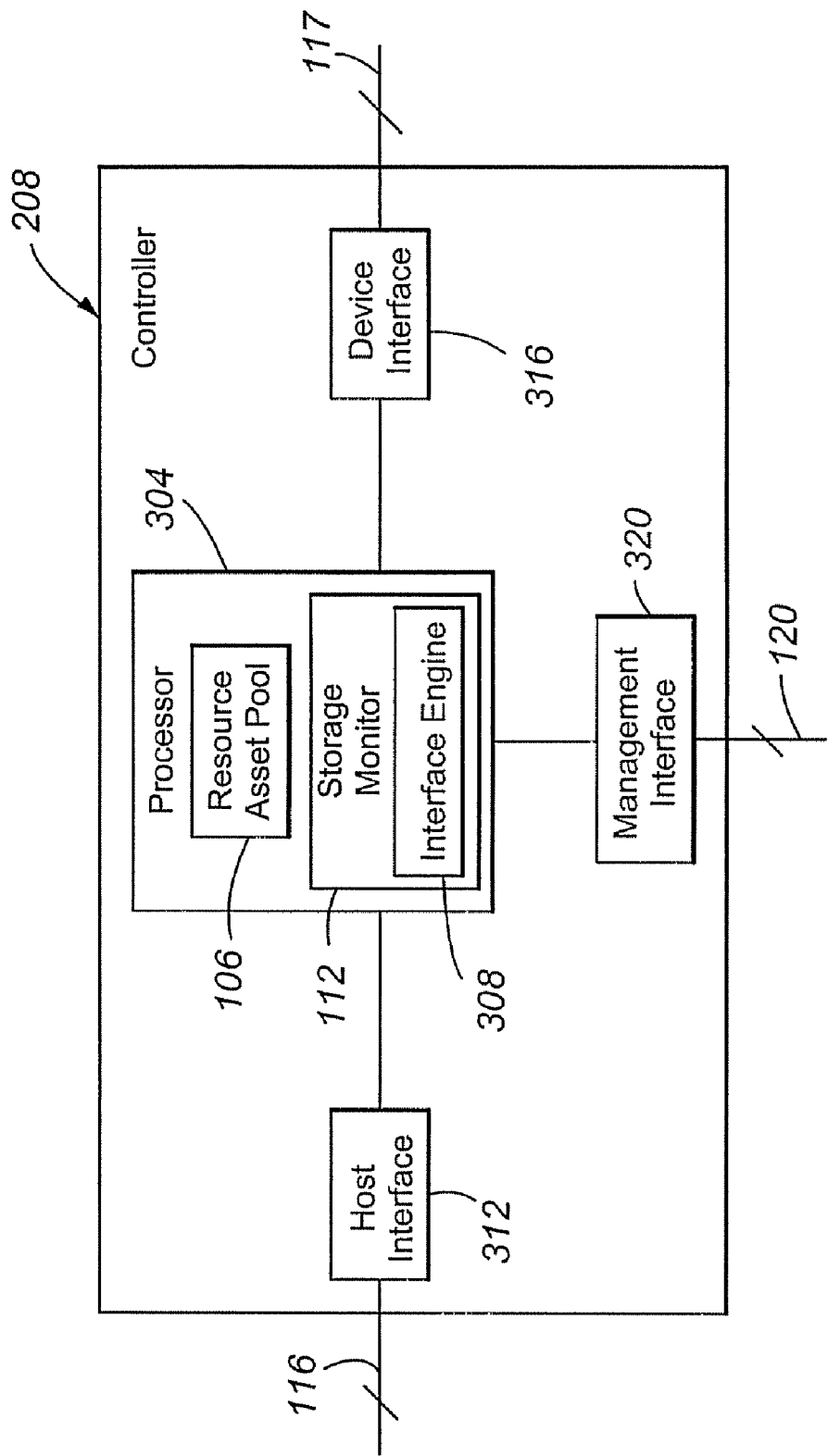
FIG. 3 is a block diagram depicting a controller in accordance with embodiments of the present invention.

FIG. 3 is a block diagram depicting a controller 208 such as may be included in a storage system 104 in accordance with embodiments of the present invention. In general, the controller 208 includes a processor subsystem 304 capable of executing instructions for performing, implementing and or controlling various controller 208 functions. Such instructions may include instructions for monitoring and managing the operation of a storage system 104. Furthermore, such instructions may be stored as software and/or firmware. As can be appreciated by one of skill in the art, operations concerning the monitoring and management of the storage system 104 may be performed using one or more hardwired and or programmable logic circuits provided as part of the processor subsystem 304. Accordingly, the processor subsystem 304 may be implemented as a number of discrete components, such as one or more programmable processors in combination with one or more logic circuits. Processor subsystem 304 may also include or be implemented as one or more integrated devices or processors. For example, a processor subsystem may comprise a complex programmable logic device (CPLD).

The processor 304 is operable to execute instructions and perform tasks associated with the storage monitor 112 function and in connection with the resource asset pool 106 function. The storage monitor 112 may include an inference engine 308, or means for making asynchronous decisions, that is capable of making fuzzy logic decisions based on incomplete and/or erratic data. The inference engine 308 is responsible for analyzing performance and other types of data and mapping them to system management policies. Based on the mapping of the data to the policies the inference engine 308 can make asynchronous management decisions for computer resources 102 such as the storage system 104, 105. In contrast to expert systems, the inference engine 308 does not necessarily rely upon rigid, predetermined thresholds to make a management decision. Rather, the inference engine 308 is capable of making management decisions based on loosely defined criterion.

The controller 208 may include a number of communication interfaces such as one or more host interfaces 312, one or more device interfaces 316, and one or more management interfaces 320. Each of these interfaces represents a potential means for receiving data related to operation of a computer resource 102. The host interface 312 is designed to interconnect the controller 208 with the host 108 via the in-band network 116. Examples of the host interface 312 include, without limitation, Fibre channel ports, iSCSI ports, parallel SCSI ports, and so on depending upon the configuration of the in-band network 116. The device interface 316 may be provided for operably interconnecting the controller 208 to the remainder of the data storage system 104, for example the storage devices through channel 117. Furthermore, the management interface 320 may be configured to facilitate communication between the controller 208 and one or both of a storage monitor 112 running on another storage system 104 and a remote storage monitor 113 running on a management workstation 110 through the out-of-band network 120.

Figure 4:
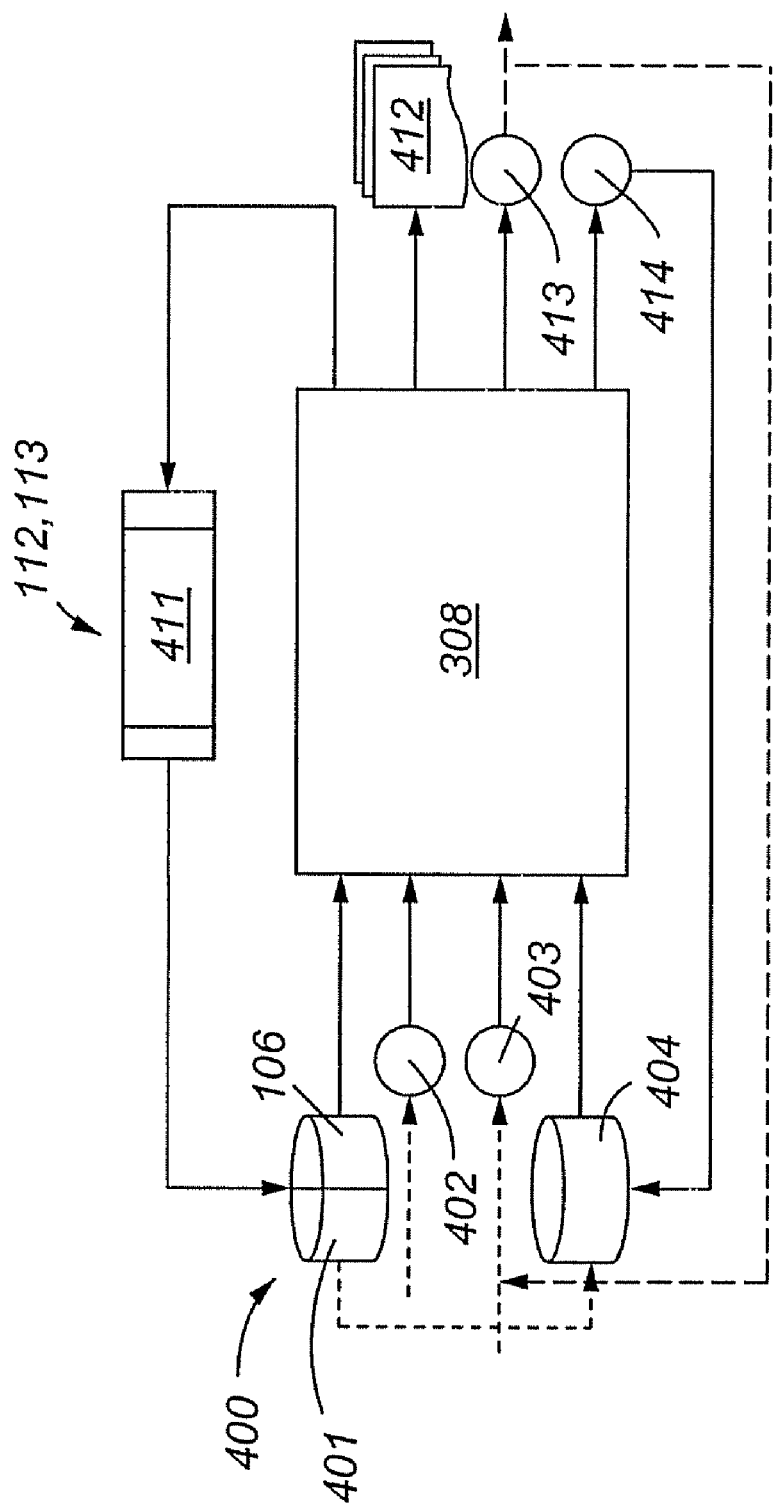
FIG. 4 is a block diagram depicting a storage monitor and data flows in accordance with embodiments of the present invention.

FIG. 4 depicts functional aspects of an exemplary storage monitor 112, 113 capable of performing management application functions and data flows in accordance with embodiments of the present invention. As previously noted, the storage monitor 112, 113 may be implemented in a storage system 104, a host 108, and/or an external management workstation 110. The storage monitor 112, 113 generally comprises an inference engine 308, a configuration data store 400 for maintaining configuration data 401 and resource asset pool 106 data, a statistics data input 402, an event input 403, and a policy store 404. The statistics data input 402 and event input 403, which typically function as a means for receiving data, are generally considered system operational data since they relate to the operation of the computer resource 102, for instance the storage system 104, 105. The configuration data store 400 and policy store 404 may comprise data sets stored in memory or other data storage.

The inference engine 308 receives data from the configuration data store 400, the statistics data input 402, and the event input 403 and analyzes the data from each of the inputs to determine a state of the computer resource 102. The state of the computer resource 102, in one embodiment, is a determined status of the system based on available operational information and configuration data 401. Additionally, a projected future state of the system may be determined based upon the configuration data 401 and the resource asset pool 106 data. Examples of states that may be identified by the inference engine 308 include system stable, system unstable, system nearly full, system nearing failure, system failed, system behind schedule, storage device nearing failure, storage device failed, controller near failure, controller failed, or any other known state related the computer resource 102 or assets associated with the computer resource.

In determining a system state, each of the inputs may be assigned a different weight. Thereafter, the inference engine 308 maps the weighted inputs to one or more policies received from the policy data store 404 to determine if any actions should be taken to control the computer resource 102. Generally, the inference engine 308 can make asynchronous decisions based on real-time inputs because the inference engine 308 does not rely on hard thresholds. Rather, the inference engine 308 can receive an input and wait to see if subsequent inputs drive the computer resource 102 status to a point where an action is warranted.

If the inference engine 308 determines that an action should be taken, then the inference engine 308 formulates the action consistent with the policies from the policy data store 404 and sends a message to the computer resource 102 requesting the implementation of the action. The message is transmitted through a message output 413 to the computer resource 102. Additionally, the message is provided as feedback to the event input 403 thus making the inference engine 308 aware of the actions it has just requested. In other words, messages are provided as feedback to the inference engine 308 so that the inputs to the inference engine 308 are current.

In one embodiment, the message may generally include executable instructions for storage system controllers 208 to perform. Alternatively, the message may include a request that actuates one or more switches connecting more computer resource assets to the computer resource 102. Another type of message that can be generated is a message to a system administrator requesting the execution of certain actions or identifying certain computer resource 102 issues. Messages may be sent via any suitable message transmission protocol including, without limitation, short message service (SMS), TCP/IP protocols, and SCSI protocols.

If the action corresponds to a configuration change or some other change related to the computer resource 102, then the action is sent to the computer resource 102 in the form of a configuration change order. When the inference engine 308 issues a configuration change order, the order is also provided as feedback 411 to the configuration data store 400. This update of the configuration data store 400 allows the inference engine 308 to use updated configuration data 401 when determining whether subsequent actions are warranted. As can be appreciated by one of skill in the art, an update to the configuration data store 400 may include transferring descriptors of computer resource assets between the configuration data 401 and the resource asset pool 106 data. If computer resource assets were added to the computer resource 102 from the resource asset pool 106, then the listing of those transferred resource assets are removed from the resource asset pool 106 data and are added to the configuration data 401. Configuration changes to the computer resource 102 may be carried out through a suitable interface, such as SMI-S, SNMP or proprietary APIs.

A further type of message that can be generated by the inference engine 308 is a policy modification or update message 414. As changes are implemented in the computer resource 102 or as changes to the environment about the computer resource 102 occur, it may be necessary to update policies in the policy data store 404 in connection with those changes. A policy update 414 is issued by the inference engine 308 and received at the policy data store 404. The creation of this type of message may also automatically generate a policy change notification message that can be sent to a system administrator notifying them of the change to the policy data store 404. As can be appreciated, since the inference engine 308 can alter its policy data store 404 as changes are implemented, the management of the computer resource 102 becomes dynamic and responsive to changes when they are made.

When the inference engine 308 makes a decision regarding the management of the computer resource 102 and issues a configuration change order 411, a policy modification message 414, and/or any other type of message, it may also send a copy of the message to an action log 412. A system administrator can later reference details about the action through the action log 412. The action log 412 provides a single point where the performance of the inference engine 308 and any computer resource 102 managed thereby can be audited and analyzed.

Initially at least, the policy data in the policy data store 404 may comprise a set of default heuristics regarding the operation of its computer resource 102 being managed. These policies or heuristics are generally described in terms using conceptual event and statistical data. For example, the storage volume is "almost full," the job is "behind schedule," the CPIJ is "about to fail" and so forth. In addition, the provided heuristics are appropriately weighted to best describe the goals of the computer resource 102 user community. For example, reliability may be the highest priority for the user community, while performance may be secondary. These policies may be modified, substantially or in part, deleted, or added to as needed to meet the intended goals of the user community. In addition to changes to policy effected by the operation of the system monitor 112, 113, policy changes may be entered directly by a system administrator.

The inference engine 308 evaluates the streams of information against the provided (or effective) heuristics or policies. This can include categorizing the information into a weighted priority scheme to best meet the policies of the computer resource 102. Moreover, even though streams of information may be complete, incomplete or noisy, such combinations will not prevent the inference engine 308 from taking timely or appropriate action. If necessary, the inference engine 308 will perform an extrapolation of the available data to make the best possible decision based on the provided policies. Accordingly, actions taken by the inference engine 308 (or more generally the storage monitor 112, 113) will be based on the effective policies (either as supplied or as modified), the configuration of the target system, the available resources of the target system, and the relevant statistical and event data. Action may therefore be taken based on vague, incomplete or noisy data from or about the computer resource 102 by evaluating the available data using intelligent (fuzzy) logic to best interpret the data against the policies.

Figure 5:
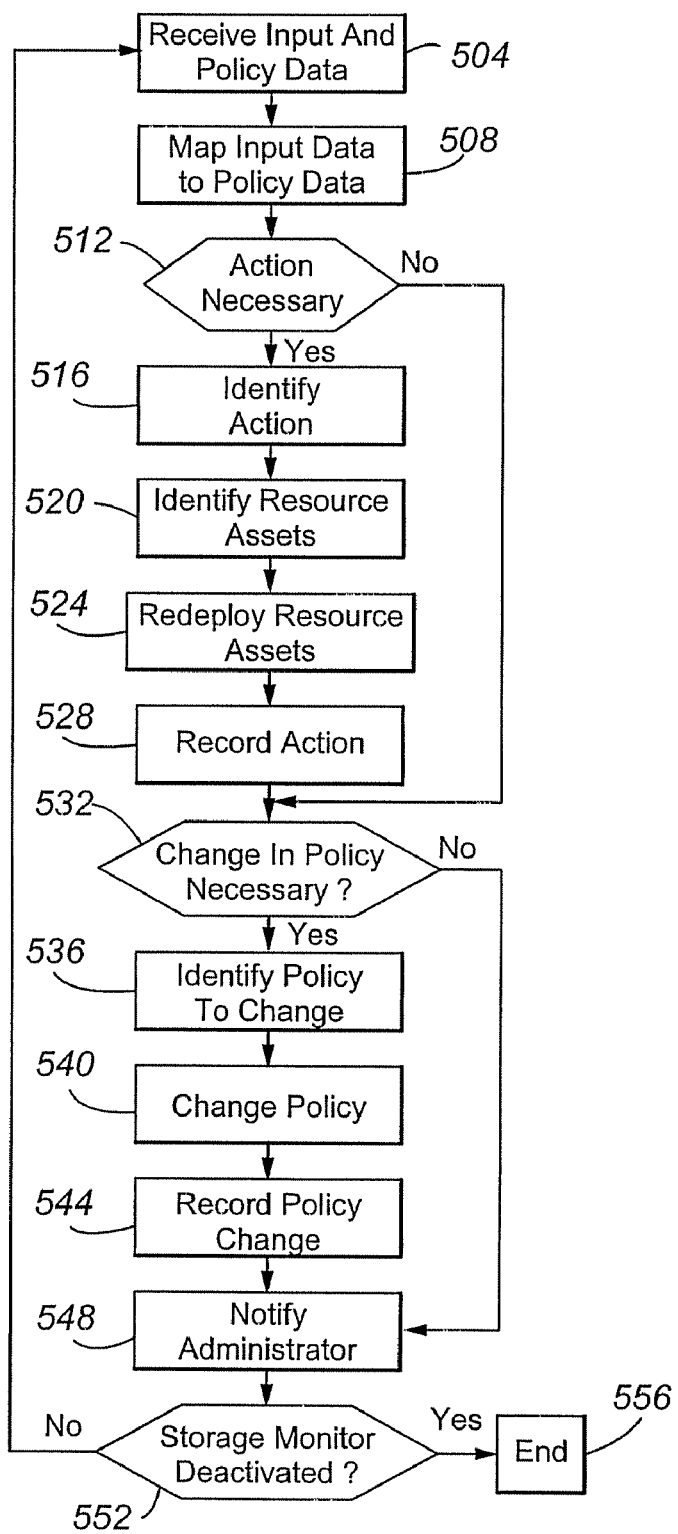
FIG. 5 is a flow chart depicting aspects of a process for automatically managing a computer resource in accordance with embodiments of the present invention.

With reference to FIG. 5, a process for managing a computer resource 102 is illustrated in accordance with embodiments of the present invention. Initially, at step 504, data is received by the inference engine 308. The received input data may include configuration data 401 and/or resource asset pool 106 data from the configuration data store 400, statistical data from the statistics data input 402, and event data from the event input 403. In some instances the received input data may be incomplete or otherwise unusable due to noise or interference encountered during transmission to the inference engine 308. Additional data that may be received by the inference engine 308 includes policy data from the policy data store 404. The inference engine 308 then maps the input data to the policy data (step 508). The policy data used in accordance with embodiments of the present invention may use descriptive language to identify conditions that are one of specific and vague in evaluation. As used herein, "vague" is understood to refer to an inexact value as opposed to a definitive threshold. As an example, a policy may be worded, "When the volume is nearly full—incrementally expand the volume to support the goals." The use of imprecise values (i.e., nearly full and incrementally expand) liberates the inference engine 308 to evaluate, for example, a rate of consumption, which may be faster than the time it takes to institute any remedial action, possibly resulting in a loss of availability or significant reduction in performance. The inference engine 308 may then choose to implement an action at 70%, 76%, 82%, or possibly 97% of volume capacity, expanding the volume incrementally (e.g., by percentage of use) as necessary. The inference engine 308 may further attempt to ensure fulfillment of the policies without loss of availability and minimal reduction in performance. It is this imprecise definition used in accordance with policy data that allows the inference engine 308 to manage a computer resource dynamically and effectively.

In the event that the received input data was incomplete or unusable, then the inference engine 308 may only map the usable input data to the policy data. Alternatively, the inference engine 308 may guess or interpolate values for the unusable input data and map the interpolated data to the policy data. In accordance with some embodiments, raw input data may be mapped to the policy data. In other embodiments, some or all of the input data may be weighted before it is mapped to the policy data as noted above.

After the input data has been mapped to the policy data, the inference engine determines whether an action is necessitated based on the state of the computer resource 102 and the policy data governing the management of the computer resource 102 (step 512). As noted above, the decision made by the inference engine 308 may be an asynchronous decision meaning that it is not made at the instant when a particular threshold is met or exceeded. In some storage systems input data may be volatile or erratic and for this reason the inference engine 308 does not rely on hard thresholds. The inference engine 308 can note that some thresholds are being exceeded but based on the policy data may wait to make a decision to implement an action. For example, if the input data continues to exceed a threshold for a certain amount of time then the inference engine 308 may decide to implement an action consistent with the policy data.

If an action has been deemed necessary by the inference engine 308, then the requisite action is identified by the inference engine 308 (step 516). An action may include the addition, removal, transfer, reconfiguration, or other adjustment to one or more computer resource assets currently employed by the computer resource 102. After the action has been identified, the computer resource asset(s) that will be affected by the action is identified (step 520). The identified computer resource asset(s) is then redeployed according to the determined action (step 524). The computer resource asset(s) may be added from, or returned to, the resource asset pool 106 and a descriptor may be updated in the resource asset pool 106 data to reflect the same. If an additional computer resource asset is required and no such assets are available in the resource asset pool 106 they may be ordered from another source, such as an outside vendor. Alternatively, the inference engine 308 may scan lower priority computer resources 102 for suitable computer resource assets. If such a resource asset is found in a lower priority computer resource 102 then computer resource assets may be disconnected therefrom and reassigned to the higher priority computer resource 102. In another embodiment, an identified action may include sending a message to prepare for the addition or removal of a computer resource asset. In still other embodiments, an action might include the adjustment to the frequency with which backups are performed and/or snapshots are taken in connection with a computer resource 102 comprising a storage system 104, 105.

After the computer resource asset has been redeployed, the action is recorded in the action log 412 (step 528). The recordation in the action log 412 may include an indication that the configuration data 401 and resource asset pool 106 data have been changed in the configuration data store 400. As previously noted, this allows the system administrator to stay apprised of the computer resource 102 management decisions made by the inference engine 308. Of course, if no actions were deemed necessary by the inference engine 308 in step 512, then steps 516-528 can be skipped.

In addition to action decisions, the inference engine 308 may determine whether a change in policy data is necessary (step 532). The issuance of a configuration change order 411 or other type of action request may warrant a change in policy data. Alternatively, a change in the environment or usage of the computer resource 102 may warrant a policy change without necessarily requiring a configuration change. Examples of changes to the usage of the computer resource 102 that may result in a policy change include an increase in rate of data storage capacity consumption, a decrease in rate of data storage capacity consumption, an increase in the number of tasks being processed per unit time, a decrease in the number of tasks being processed per unit time, and so forth. Similar to the action decision made in step 512 by the inference engine 308, the policy decision made in step 532 can be an asynchronous decision. In making asynchronous policy decisions the inference engine 308 gives itself time to further analyze the state of the computer resource 102 or to receive additional data before a policy decision is made.

If the decision has been made to change a policy, then the inference engine identifies which policy or policies should be changed (step 536). The identified policy or policies are then changed according to the decision of the inference engine 308 (step 540). In one example, the relative importance of various policies in the policy data store 404 can be changed if more or less activity has been observed in certain computer resources 102. As a further example, an initial policy might be stated as, create a 5 TB Online Transaction Processing (OLTP) database that will handle 1200 Transactions per second (TPS) and grow at the rate of 1 TB per year. If the number of transactions per month is significantly higher than was expected when the initial policy was instituted, then the policy may need to be changed to have the system grow at a rate of 1.5 TB per year. Alternatively, the policy may be changed if more users are requiring data storage at the same time. In this instance, the policy may be changed to require the database to handle 1500 TPS instead of the original 1200 TPS. As can be appreciated, other aspects of policies may be modified or updated based upon certain conditions of the computer resource 102. Once a policy has been changed, the change is recorded in the action log 412 (step 544). The system administrator can then be notified of the change to the policy as well as any other actions that have been taken by the inference engine 308 (step 548).

If the inference engine 308 determines that no policy decision is necessary, then a system administrator can be notified of any actions or inactions of the inference engine 308 (step 548). A system administrator may be notified through a message sent directly to him/her or the system administrator may be notified through a request to view the action log 412. After the system administrator has been notified of the change, if any, then the process continues to step 552 where it is determined if the storage monitor 112, 113 is deactivated. If the storage monitor 112, 113 is not deactivated (i.e., it is still monitoring the computer resource 102), then the process may return to step 504 to receive inputs and determine if an action is necessary based on new policies or existing policies if there was no policy change. However, if the storage monitor 112, 113 is deactivated, then the process ends (step 556).

Figure 6:
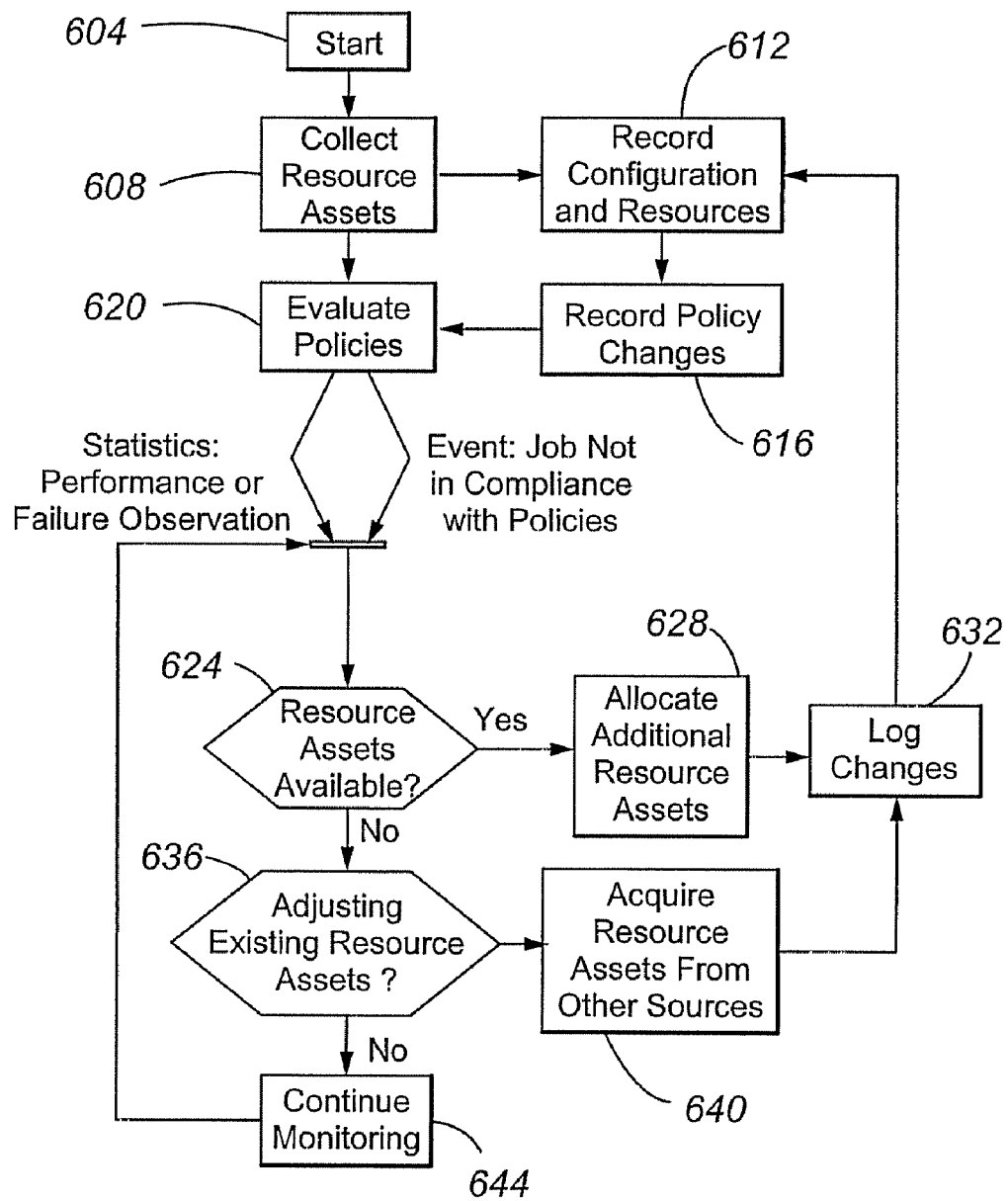
FIG. 6 is a flow chart depicting aspects of a process for adjusting computer resource configurations in accordance with embodiments of the present invention.

Referring now to FIG. 6, a process for managing a computer resource 102 such as may be implemented by a storage monitor 112, 113 in accordance with other embodiments of the present invention is illustrated. The method starts in step 604 then proceeds to step 608 where information regarding computer resource assets is collected. In this particular step the inference engine 308 may scan for all computer resource assets associated with the computer resource 102 under its management. The computer resource assets discovered during this scanning step can then be compared to a list of known resources in the configuration data store 400. If one of the resources is not in the list of known resources in the configuration data store 400, then the attributes for that resource are discovered by the inference engine 308 using known query and response methods. Then the information regarding the computer resource assets is stored or otherwise maintained in the configuration data store 400 (step 612). Those computer resource assets that are actively associated with the computer resource 102 may have their descriptors stored in the configuration data 401 whereas those computer resource assets not actively associated with the computer resource 102 may have their descriptors stored in the resource asset pool 106 data portion of the configuration data store 400. Once the configuration data store 400 has been updated properly, any policy changes that are made in response to the determination of computer resource assets and configuration data may be recorded in the policy data store 404 (step 616). The inference engine 308 then evaluates and uses the most recent policies in the policy data store 404 and compares them with input data from the computer resource 102 (step 620).

The inference engine 308 continues to receive input data from the computer resource 102 and maps that to the policy data. The input data may include event data as well as statistical data. An event may occur that drives the inference engine 308 to determine that a configuration change is warranted in order to comply with or satisfy the current policies. Such events and subsequent asynchronous decisions are illustrated as broken lines connecting step 620 and step 624. Examples of an event that may lead to an asynchronous decision by the inference engine 308 includes, without limitation, event data indicating that a job is not in compliance with policies or statistics data indicating that the computer resource 102 performance is changing or that a computer resource asset has failed. If such an event occurs, then the inference engine 308 determines if any computer resource assets are readily available in the resource asset pool 106 for use by the computer resource 102 that can be activated in order to satisfy the current policies (step 624). In the event that computer resource assets are available in the resource asset pool 106 that can be applied so that the computer resource 102 will satisfy (or better satisfy) the current policies, then those resource assets are allocated to the computer resource 102 (step 628). Thereafter, the changes in the computer resource 102 are logged in the action log 412 (step 632). Any configuration changes are also recorded in the configuration data store 400 (step 612). The change to the configuration data store 400 may include moving descriptors of the allocated computer resource assets from the resource asset pool 106 data to the configuration data 401.

If there are no computer resource assets readily available for the computer resource's 102 use, then the inference engine 308 analyzes existing resource assets that are currently being used by other computer resources 102 to determine if existing computer resource assets can be adjusted (step 636). Specifically, the inference engine 308 may scan all computer resources 102 that have a lower priority than the computer resource 102 requiring an additional computer resource asset. If it is determined that existing computer resource assets can be adjusted, then those computer resource assets from the lower priority computer resource 102 can be reallocated to the higher priority computer resource 102 (step 640). In this step, the computer resource assets that are being reallocated are disconnected from the lower priority computer resource 102 and connected to the higher priority computer resource 102. Thereafter, the changes to the configuration of all affected computer resources 102 are logged in the action log 412 (step 632). Then the configuration data store 400 is updated to reflect the same changes (step 612). However, if there are no computer resource assets that can be reallocated, the inference engine 308 continues monitoring the computer resource 102 performance and may notify a system administrator that additional computer resource assets are required from an outside source (step 644). As a part of this step, the inference engine 308 may update the policy data store 404 to show that the computer resource 102 is malfunctioning or operating in a near failure or non-fault tolerant state. This may result in alteration to the policy data. For example, policies may be altered so that backups and/or snapshots are taken more frequently.

Figure 7:
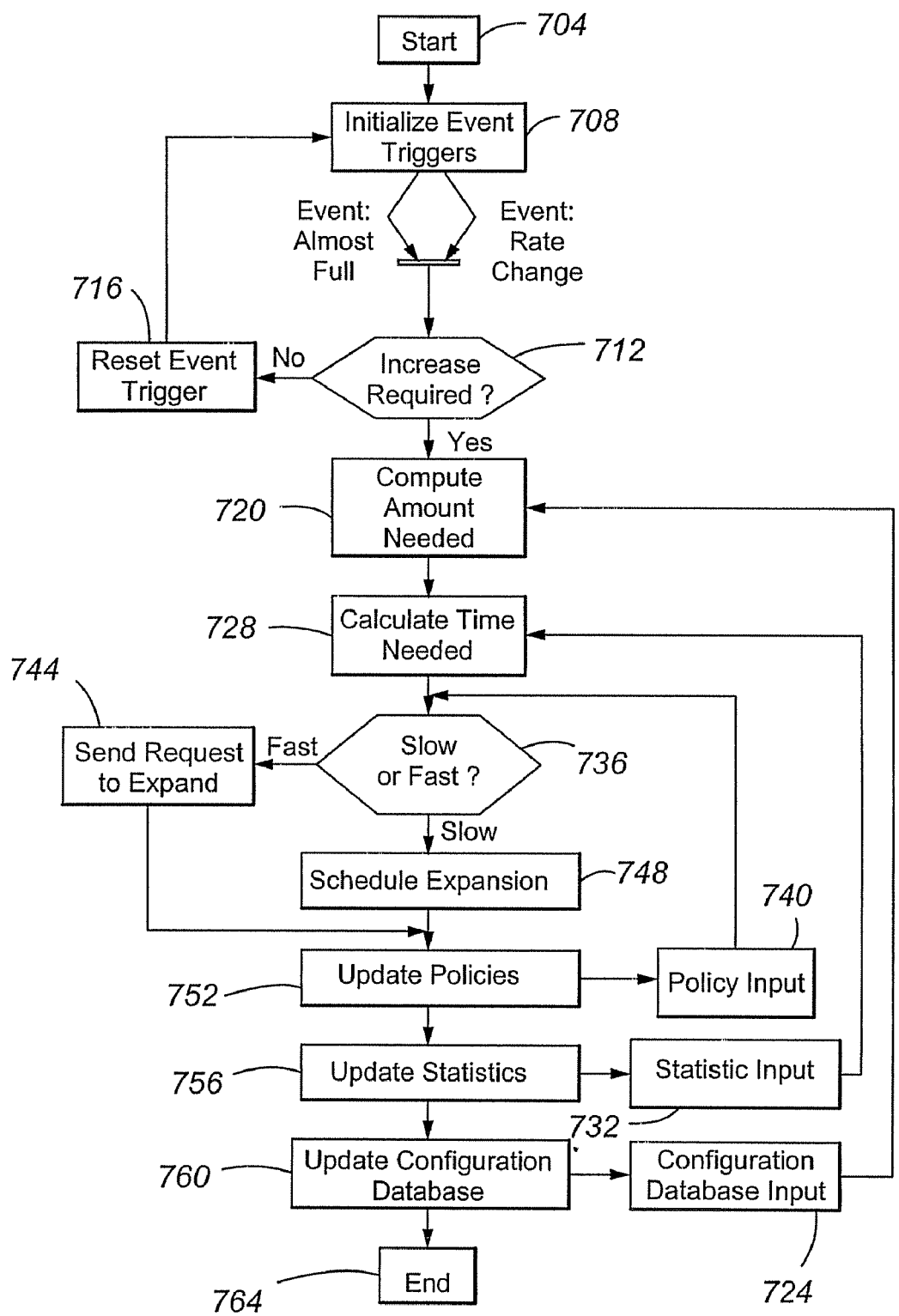
FIG. 7 is a flow chart depicting aspects of an exemplary process for expanding capacity of a storage system in accordance with embodiments of the present invention.

With reference to FIG. 7, an exemplary storage monitor 112, 113 process of expanding capacity in a computer resource 102 will be described in accordance with embodiments of the present invention. The method starts in step 704 then proceeds to step 708 where event triggers are initialized. An event trigger may be associated with policy data used to make asynchronous decisions regarding the management of the computer resource 102. Once the event triggers are initialized, meaning that they are set to a default value where no action is to be taken, the inference engine 308 monitors the computer resource 102 and waits until the occurrence of an event that changes the value of the event trigger. The broken arrows depicted connecting step 708 and 712 represent an asynchronous decision that one or more event triggers should have their default value changed. Examples of such events include the inference engine 308 determining that the computer resource 102 is in an almost full state or that the rate of tasks being processed by the computer resource 102 has changed. Other examples of events that may be received from the event input 403 include job start notifications, job completion notifications, failure notifications, system change notifications, abnormal storage condition notifications, and so forth. If one of these or a similar event occurs, then the inference engine 308 determines if an increase in capacity of the computer resource 102 is required (step 712). The inference engine may wait and continue monitoring input data for a certain amount of time after the event trigger has changed values to ensure that an expansion is required. If after analyzing further input data the inference engine 308 determines that no increase is required, then the values of the event triggers are reset to their default value and the inference engine 308 continues monitoring the computer resource 102 (step 716). On the other hand, if the inference engine 308 determines that an increase in capacity is required, then the inference engine 308 determines the amount of computer resource assets needed to make the determined expansion (step 720). The inference engine 308 uses the configuration data 401 and/or resource asset pool 106 data from the configuration data store 400 to determine what amount of computer resource assets are needed and what computer resource assets are available (step 724). The inference engine 308 may determine that additional storage devices 204 or controllers 208 are needed to make the expansion. Alternatively, the inference engine 308 may determine that other computer resource assets are needed, such as additional processors or servers to make the desired expansion.

After the inference engine 308 has determined the amount of computer resource assets needed to accommodate the expansion, it calculates the amount of time needed to make the expansion (step 728). The amount of time needed can be determined by using statistical data from the statistics data input 402 (step 732). The statistical data may help determine how much time the computer resource 102 has before it completely fails or otherwise becomes unable to meet the policies contained in the policy data store 404. Examples of statistical data include, but are not limited to computer resource 102 loading statistics, deviations in operation performance, number of jobs currently in queue, job receipt rate, job completion rate, and the like. Moreover, the statistical data may comprise a mathematical indicator of computer resource 102 performance parameters and may be an absolute value or a relative deviation from desired system performance. The inference engine 308 may also estimate the amount of time needed to add the required computer resource assets based on their availability or the lag time inherent in ordering such a computer resource asset.

Once the amount of time needed to expand is determined, the inference engine 308 determines if the expansion can be made slowly or whether the expansion needs to be made relatively quickly (step 736). This determination can be based upon current policy data received from the policy data store 404 (step 740). For example, if the subject computer resource 102 requiring expansion is relatively important to business operations and thus has a high priority, then the inference engine 308 may determine that a fast change is required. However, if the subject computer resource 102 has a relatively low priority, then the inference engine 308 may determine that a slow change will suffice. If a fast change is required, then the inference engine 308 sends a request to expand the computer resource 102 by adding computer resource assets thereto (step 744). These resource assets may be retrieved from the resource asset pool 106 or may be borrowed from a lower priority computer resource 102. Alternatively, if a slow change can be accommodated, then the inference engine 308 may schedule an expansion of the computer resource 102 by ordering computer resource assets from an alternative source and may notify a system administrator that computer resource assets will arrive and should be added to the computer resource 102 by a certain date.

After the expansion has either been implemented or scheduled, then the corresponding policies are updated in the policy data store 404 (step 752). As can be appreciated, policy data for the computer resource 102 receiving the expansion may not be the only policy data that is updated. If computer resource assets were borrowed from a lower priority computer resource 102, then the policy data associated with that computer resource 102 can be updated as well. Furthermore, the statistic input is updated to reflect the expansion of the computer resource 102 (step 756). In addition to updating statistical data, the inference engine 308 may update the configuration data store 400 to reflect the configuration changes (step 760). As noted above, descriptors of new computer resource assets may be added to either the configuration data 401 or the resource asset pool 106 data depending upon where the computer resource asset is added. Moreover, descriptors for computer resource assets moved from the resource asset pool 106 to an active state in the computer resource 102 may be moved from the resource asset pool 106 data to the configuration data 401. After all of the requisite data and data stores have been updated, the method ends (step 764). As can be appreciated by one skilled in the art, when the method ends, it may cycle back to the start and continue monitoring/managing the computer resource 102.

A particular example of updating policies in response to the discovery (or alternatively the reading) of computer resource configuration data, expressed in pseudo-code, is as follows: Discover:

```
{
  Scan for all physical devices
  Compare discovered devices to known devices in the system
  If device is new
  {
    Get its attributes
    Prepare it for use
    Add it to the Resource Pool
  }
  Else if known device is discovered to be malfunctioning or missing
    If known device was in use
    {
      Isolate it until maintenance can determine action
      Move device from Configuration DB to Resource Pool
      Update Resource Pool descriptor showing device as blacklisted
      Locate a suitable replacement from the Resource Pool
      If replacement found
      {
        Prepare it for use
        Remove it from Resource Pool
        Configure it into the target vdisk
        Start rebuild, if needed
        When finished, add it to the Configuration DB
      }
      Else
      {
        Evaluate usage of resources in Configuration DB
        If a lower priority vdisk has a suitable replacement
        {
          Disconnect that device from the lower priority vdisk
          Connect that device to target vdisk
          Update policies to show disabled lower priority task
```

```
          Update configuration DB to show new disk in target
        }
        Else
        {
          Update policies to show disabled target vdisk
          Generate event(s) to reflect condition
          Update logs
        }
      }
  }
}
```

Although the above description generally includes examples of storage systems 104, 105 as the computer resource 102, the present invention is not limited to the management of storage systems 104, 105. Instead, novel aspects of the present invention may be deployed in the automatic management of any computer resource 102 including, without limitation, storage systems 104, 105, a collection of servers, a processor bank, and/or other collections of computer enabled devices or facilities.

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art.

What is claimed is:

1. A computer implemented method of managing operation of a computer resource, comprising:

discovering computer resource assets that are available to the computer resource;

maintaining data related to the computer resource assets and a configuration of the computer resource assets;

collecting event data about the computer resource that may impact the computer resource's ability to meet a set of policies related to the computer resource, wherein at least one policy in the set of policies comprises an inexact and non-numeric value, wherein event data comprises data indicating that a job is not in compliance with said set of policies, wherein said set of policies specify inexact computer resource values;

accumulating relevant statistical data about the computer resource that may impact the computer resource's ability to meet the set of policies related to the computer resource, wherein statistical data comprises computer resource loading statistics, deviations in operation performance, number of jobs currently in queue, job receipt rate, job completion rate, and mathematical indication of computer resource performance parameters;

analyzing the event data and the statistical data against the set of policies; based on the analyzing step, determining that at least one action is to be performed in connection with the computer resource;

invoking the at least one action; and updating the data related to the computer resource assets and the configuration of the computer resource assets according to the at least one action.

2. The method of claim 1, wherein maintaining data comprises storing configuration data related to computer resource assets actively employed by the computer resource and resource asset pool data related to computer resource assets not actively employed by the computer resource.

3. The method of claim 2, wherein the at least one action comprises a computer resource asset configuration change that results in at least one computer resource asset being assigned to the computer resource from a computer resource asset pool, and wherein updating the data comprises:
moving a descriptor of the at least one computer resource asset from the resource asset pool data to the configuration data.

4. The method of claim 1, wherein the at least one action comprises changing at least one aspect of the set of policies.

5. The method of claim 4, wherein the computer resource comprises a data storage system, wherein a first policy included in the set of policies comprises at least one of a rate at which the data storage system is to be backed up and a rate at which snapshots are to be taken of the data storage system, wherein the first policy is based on an estimate of data capacity consumption rate, wherein during the analyzing step it is determined that an actual data capacity consumption rate differs from the estimate of data capacity consumption rate, and wherein updating the data comprises:
adjusting at least one of the rate at which the data storage system is to be backed up and the rate at which snapshots are to be taken of the data storage system.

6. The method of claim 1, further comprising notifying a system administrator about the at least one action.

7. The method of claim 1, wherein said method is performed by execution of a management application.

8. The method of claim 1, wherein a human user specifies at least one policy in the set of policies using spoken descriptive language to identify conditions that are one of specific and vague in evaluation.

9. The method of claim 8, wherein evaluation of the conditions is triggered by said event data.

10. A system for managing a computer resource, comprising:
a processor;
an input operable to receive data related to operation of said computer resource, wherein said data is at least one of configuration data, resource asset pool data, statistical data, event data, and policy data;
memory, wherein a set of policies related to said computer resource are stored in said memory, wherein at least one policy in the set of policies comprises an inexact and non-numeric value, wherein said set of policies specify inexact computer resource values;
a management application running on said processor, wherein:
data received at said input is mapped to said policies, and wherein:
in a first mode of operation:
said management application determining a first configuration change to be made to said computer resource in response to said mapping of data to at least one of said policies;
said management application at least partially implementing said first configuration change to said computer resource, wherein said data received at said input comprises an indication of said at least partially implementing said first configuration change to said computer resource;
in a second mode of operation:
said management application creating a modified set of policies stored in said memory in response to mapping said at least a portion of said data to at least one of said policies;
said management application determining a second configuration change to be made to said computer resource in response to said mapping of data to said modified policies;
said management application at least partially implementing said second configuration change to said computer resource, wherein said data received at said input comprises an indication of said at least partially implementing said second configuration change to said computer resource.

11. The system of claim 10, wherein said received data mapped to said at least one of said policies is incomplete with respect to said at least one of said policies, and wherein said configuration change is determined based on said incomplete data.

12. The system of claim 10, wherein said at least partial implementation of said determined configuration change to said computer resource includes said management application notifying an administrator to order a required computer resource asset, wherein the required computer resource asset is not currently available to the computer resource.

13. The system of claim 10, further comprising:
a pool of available computer resource assets, wherein said at least partial implementation of said determined change to said computer resource includes assigning one of said available resource assets to said computer resource.

14. The system of claim 13, wherein said computer resource comprises a data storage system, wherein said pool of available computer resource assets includes additional storage volume, wherein said change to said computer resource implemented by said management application includes adding said additional storage volume to storage operable as part of said computer resource.

15. The system of claim 13, wherein said computer resource comprises a data storage system, wherein said pool of available computer resource assets includes computer resources in operation that are at least one of physical and logical components of said system to satisfy a goal of said policies.

16. The system of claim 10, wherein a configuration of said computer resource is stored in said memory, and wherein in response to a change to said configuration said configuration stored in memory is changed to reflect said changed configuration.

17. The system of claim 10, wherein a human user specifies at least one policy in said policies using spoken descriptive language to identify conditions that are one of specific and vague in evaluation.

18. The system of claim 17, wherein evaluation of said conditions is triggered by event data.

19. A device for managing a computer resource, comprising:
means for receiving data related to operation of said computer resource; and
means for making asynchronous decisions related to the management of the computer resource comprising:
means for mapping said received data to a set of policies related to said computer resource, wherein at least one policy in the set of policies comprises an inexact and non-numeric value, wherein said set of policies specify inexact computer resource that do not comprise thresholds;

means for determining that management action is indicated;

means for identifying said management action;

means for identifying a resource asset requiring redeployment to implement said management action;

means for locating said identified resource asset;

means for requesting a redeployment of said identified resource asset to implement said management action, wherein said data related to operation of said computer resource includes requested redeployment of said identified resource asset to implement said management action; and means for recording said redeployment of said identified resource asset to implement said management action, wherein asynchronous decisions are fuzzy logic decisions based on incomplete and/or erratic data.

20. The device of claim 19, wherein the means for making asynchronous decisions further comprises:

means for determining that a change to a first policy included in said set of policies is indicated by said received data; and means for changing said first policy.

21. The device of claim 20, wherein the means for changing references an initial system resource configuration prior to changing the first policy.

22. The device of claim 21, wherein said computer resource comprises a data storage system, wherein a first policy included in said set of policies comprises an estimate of a rate at which data storage capacity provided by said computer resource is consumed, wherein said means for changing is operable to change the first policy by either increasing or decreasing the estimated rate, wherein the rate at which data storage capacity provided by said computer resource is consumed is in relation to time.

23. The device of claim 21, wherein said computer resource comprises a data storage system, wherein said first policy included in said set of policies comprises an estimate of an amount of data storage required, wherein said means for changing effects a change in the first policy that includes either an increase or a decrease in said estimated amount of data storage, and wherein in response to an increase in said estimated amount of data storage said means for requesting a redeployment of said identified resource asset prepares a request to add a storage volume to said computer resource.

24. The device of claim 23, wherein in response to a decrease in said estimated amount of data storage said means for requesting a redeployment of said identified resource asset prepares a request to remove a storage volume from said computer resource.

25. The device of claim 19, wherein said computer resource comprises a data storage system, wherein said management action comprises a change to a frequency at which backup procedures are performed, wherein said identified resource comprises at least one of data storage volume and data channel bandwidth, and wherein said means for requesting a redeployment said identified resource prepares a request to reallocate a proportion of said resource used to perform backup procedures.

26. The device of claim 19, wherein the means for making asynchronous decisions further comprises:

means for maintaining a pool of available resource assets; and means for maintaining a record of said available resource assets in said pool, wherein said identified resource asset is selected from said pool, and wherein said means for recording said redeployment of said identified resource asset removes said identified resource asset from said record of available resource assets.

27. The device of claim 26, wherein said means for recording said redeployment of said identified resource asset additionally includes means for adding said identified resource asset to a record of a current configuration of said computer resource.

* * * * *